Figure 1:
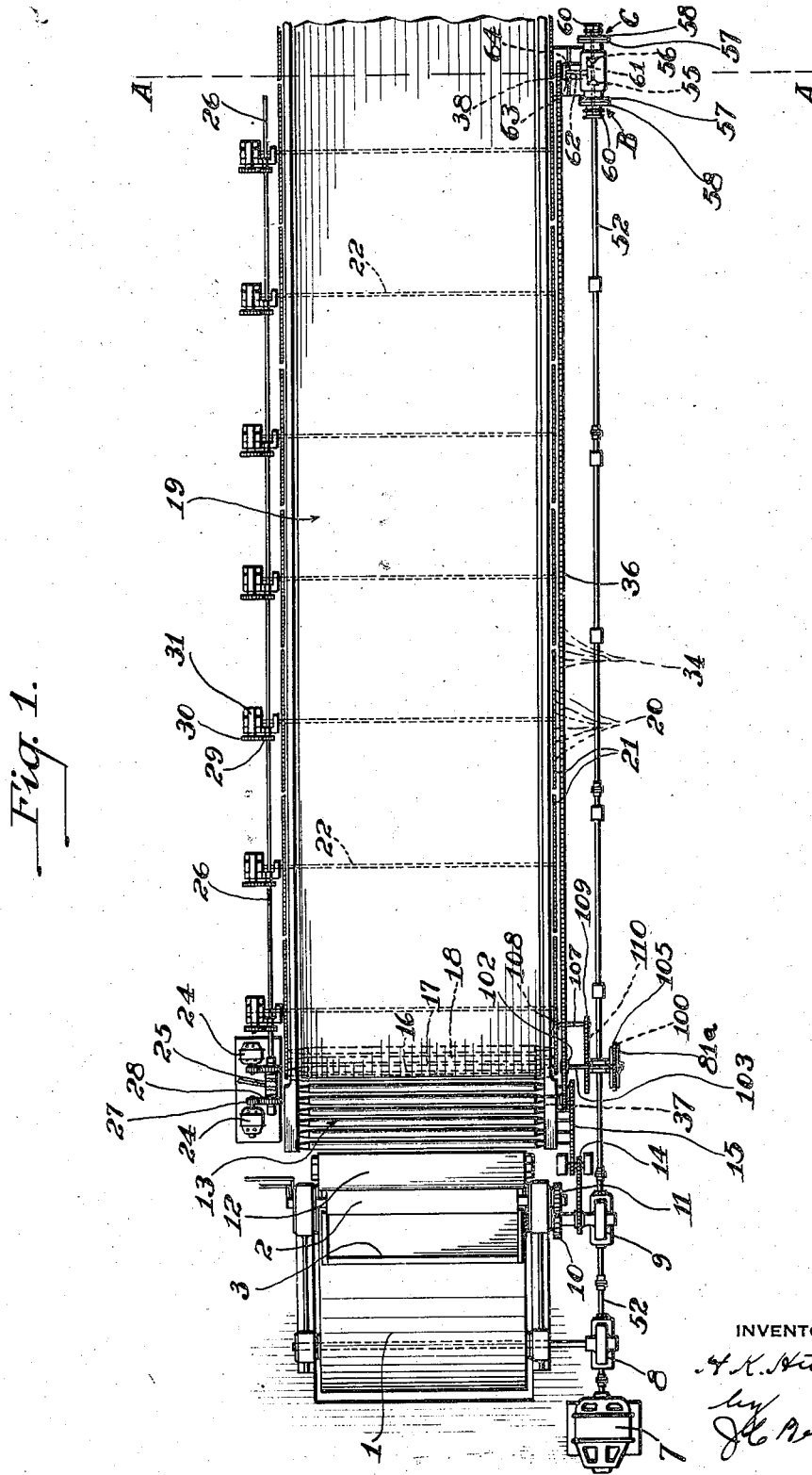

Aug. 9, 1927.

H. K. HITCHCOCK

LEER CONSTRUCTION

Filed Nov. 30, 1926

1,638,769

10 Sheets-Sheet 3

INVENTOR
H. K. Hitchcock

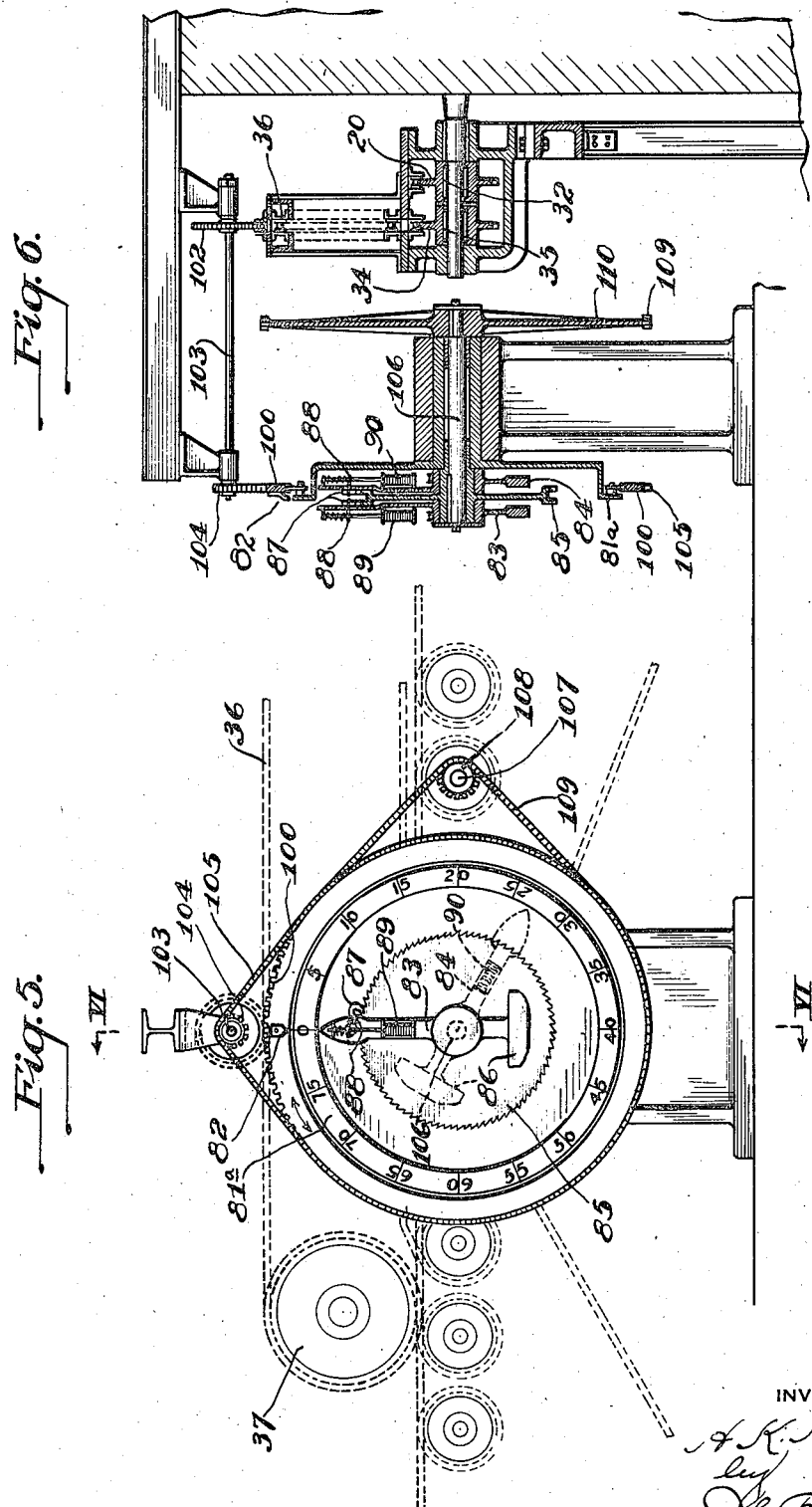

Aug. 9, 1927.

H. K. HITCHCOCK

LEER CONSTRUCTION

Filed Nov. 30, 1926

1,638,769

10 Sheets-Sheet 5

INVENTOR
H. K. Hitchcock
by
J. C. Bradley
atty

Aug. 9, 1927.
H. K. HITCHCOCK
LEER CONSTRUCTION
Filed Nov. 30, 1926
1,638,769
10 Sheets-Sheet 6
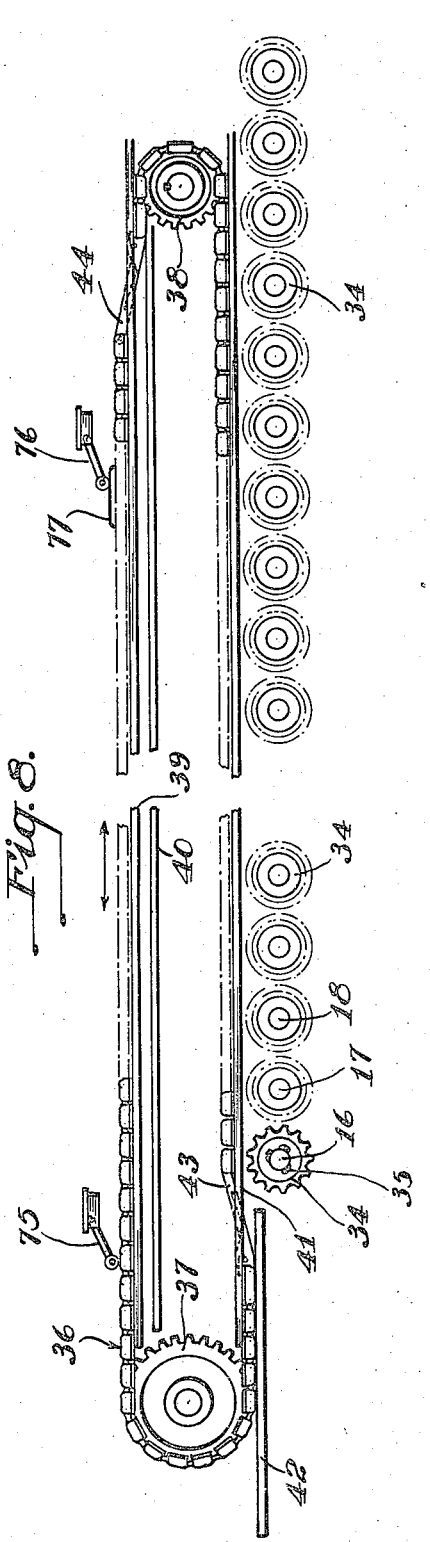
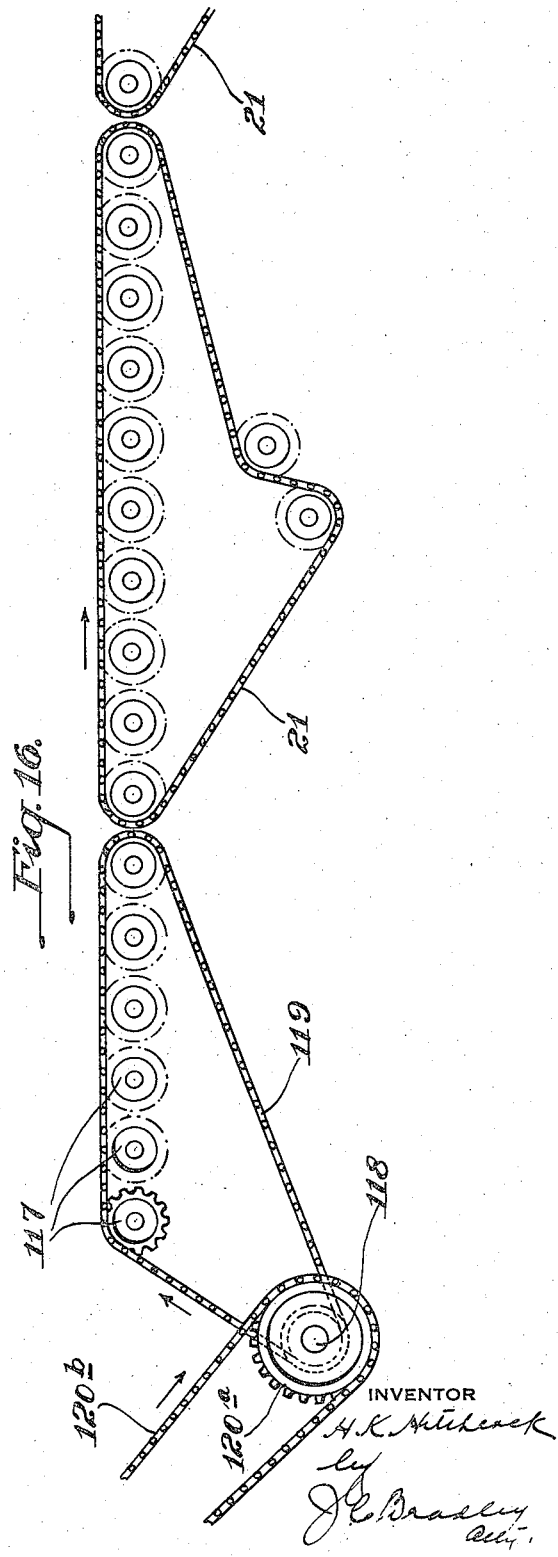

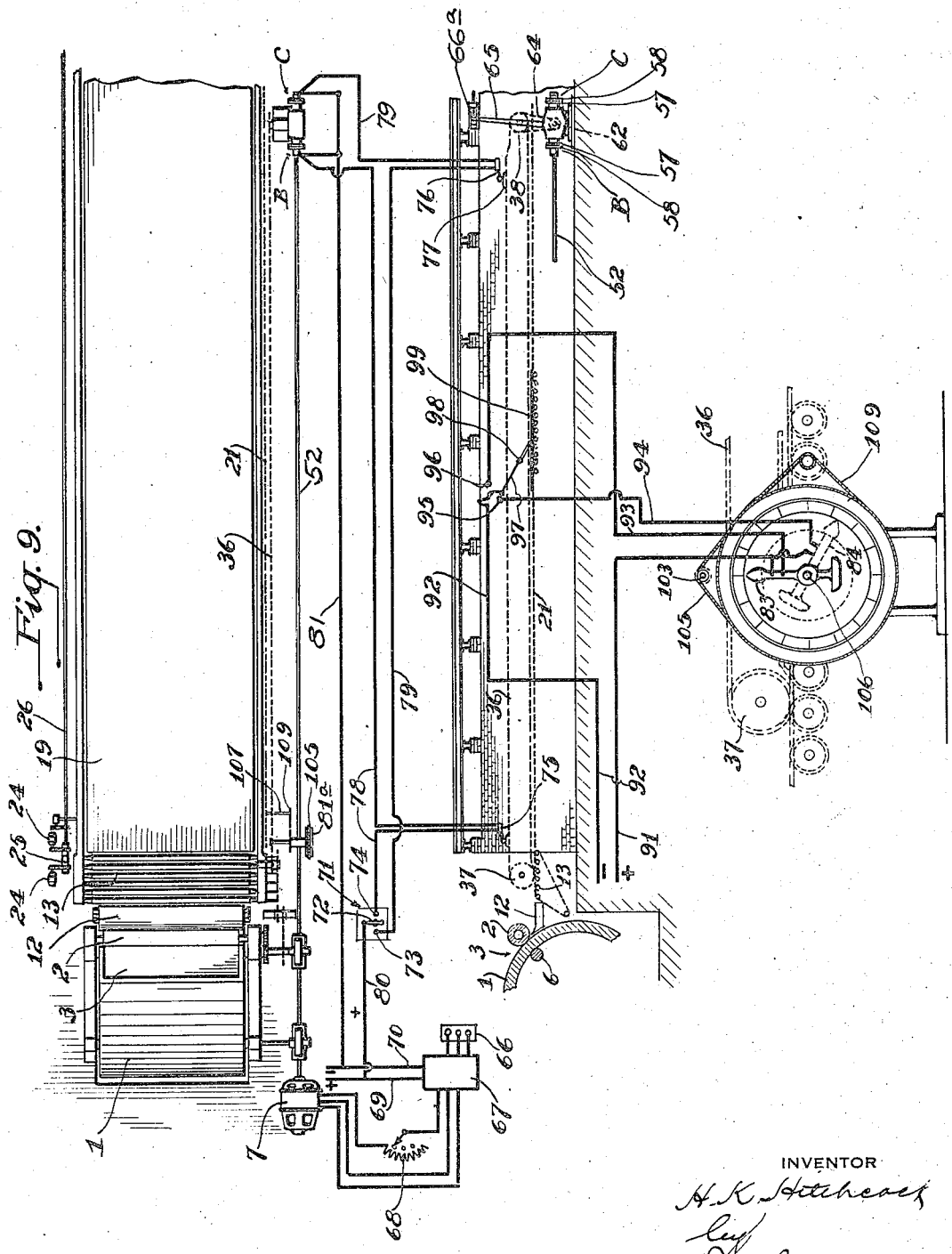

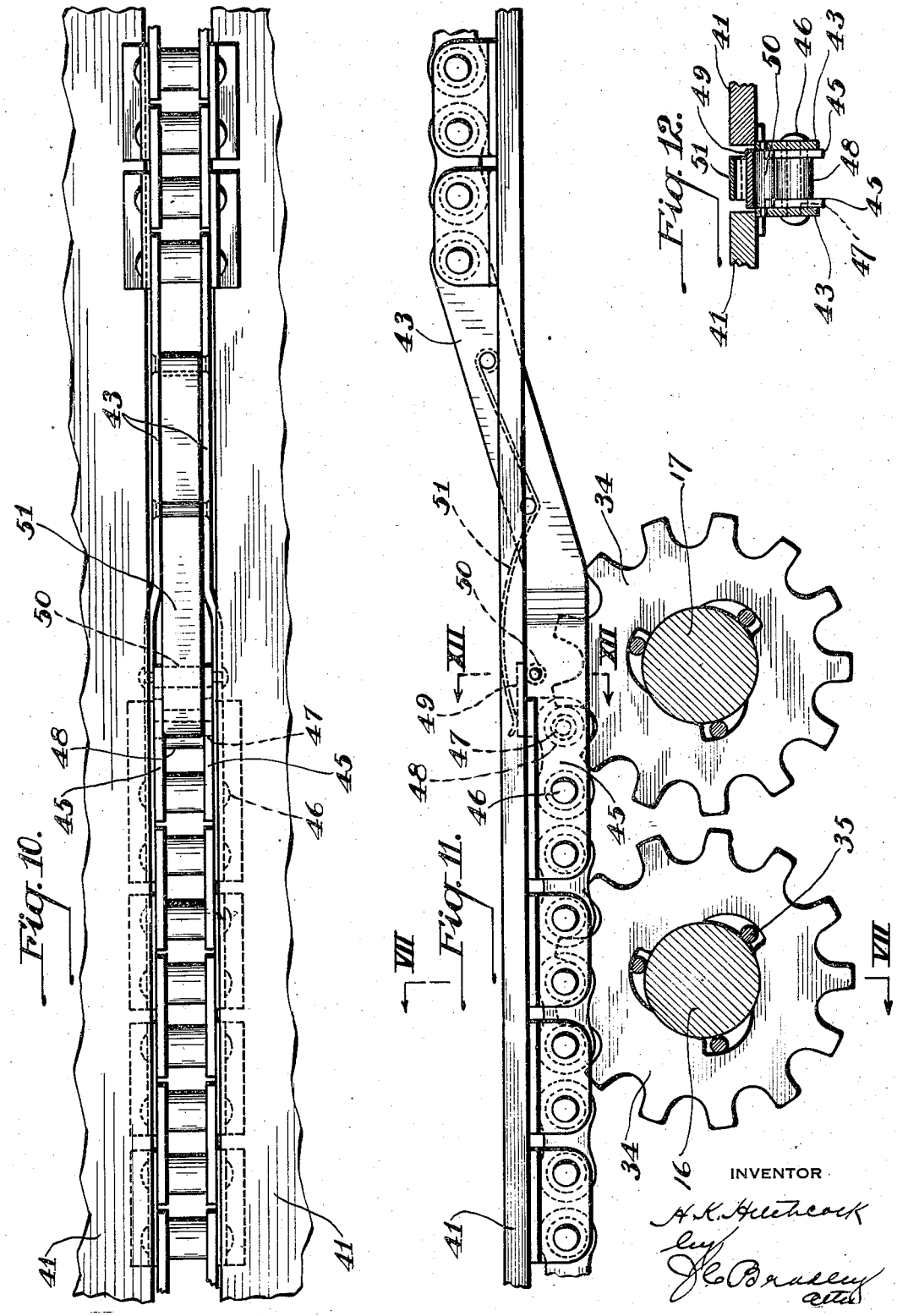

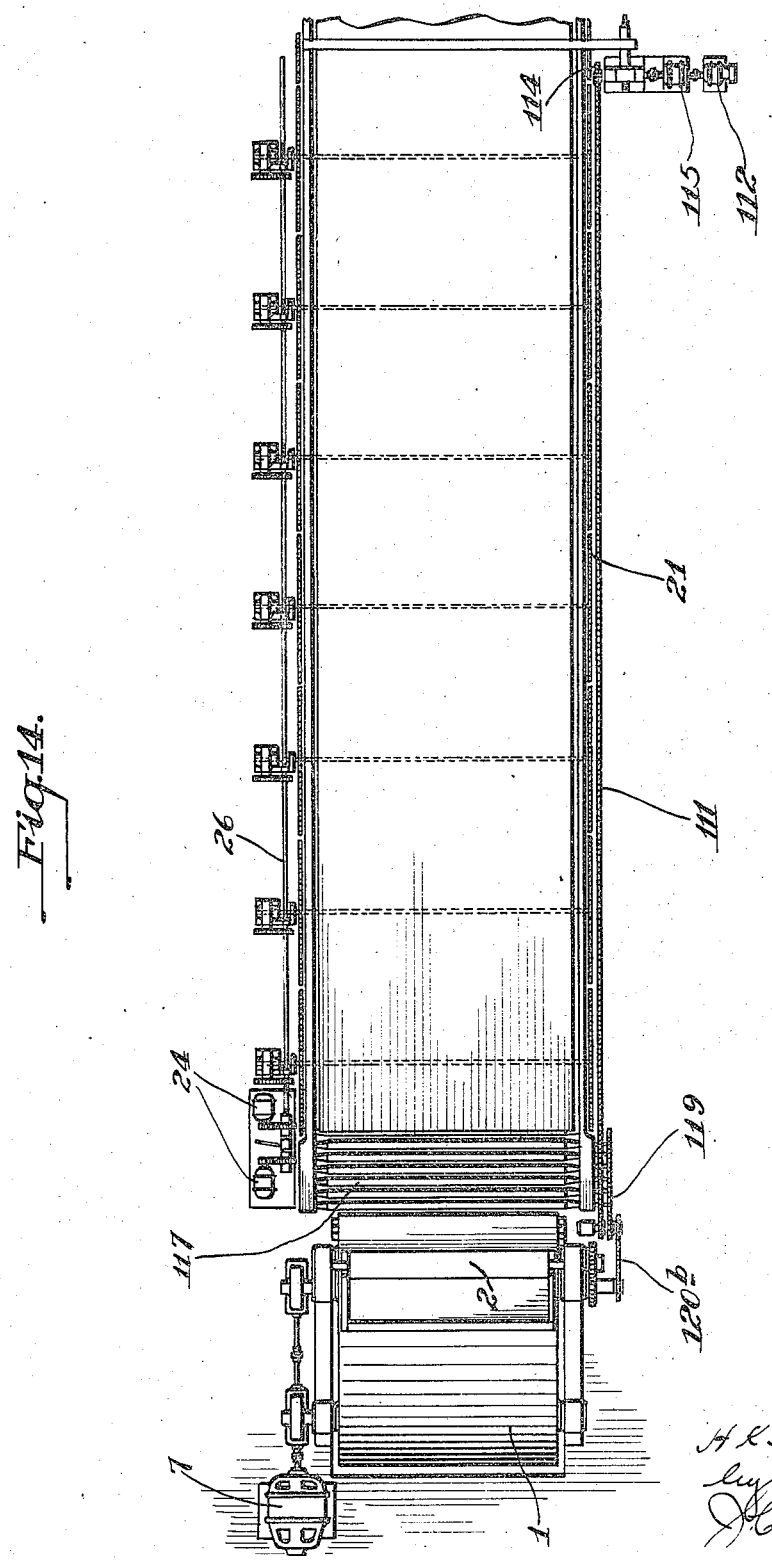

Aug. 9, 1927.
H. K. HITCHCOCK
LEER CONSTRUCTION
Filed Nov. 30, 1925
1,638,769
10 Sheets-Sheet 10
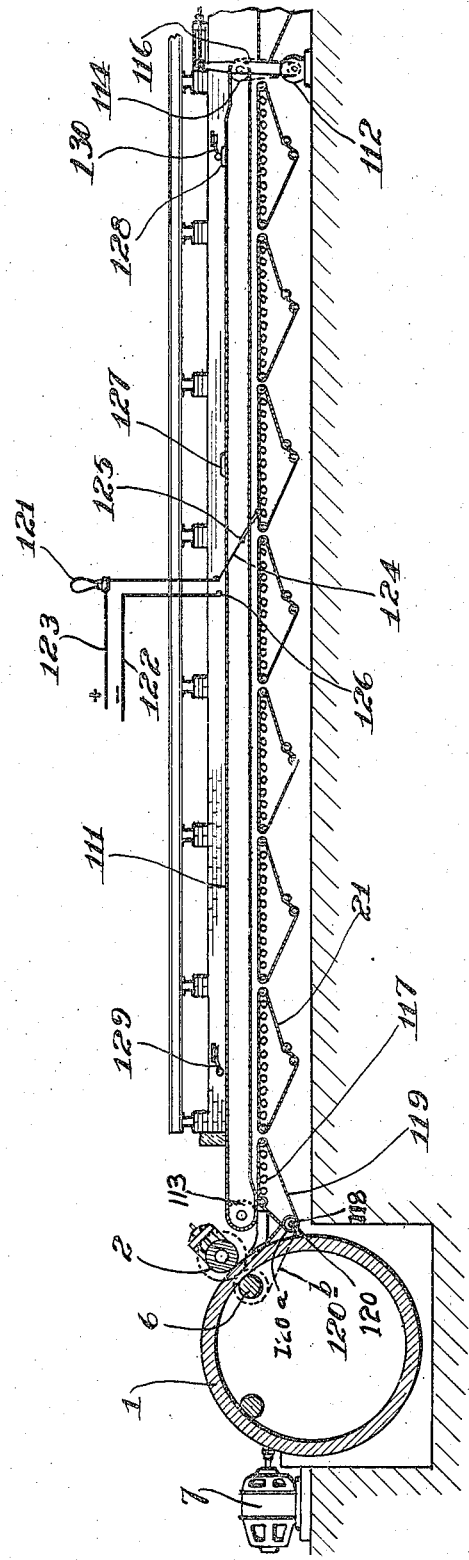
INVENTOR
H. K. Hitchcock Patented Aug. 9, 1927.

1,638,769

UNITED STATES PATENT OFFICE.

HALBERT K. HITCHCOCK, OF PITTSBURGH, PENNSYLVANIA, ASSIGNOR TO PITTSBURGH PLATE GLASS COMPANY, A CORPORATION OF PENNSYLVANIA.

LEER CONSTRUCTION.

Application filed November 30, 1926. Serial No. 151,693.

Figure 2:
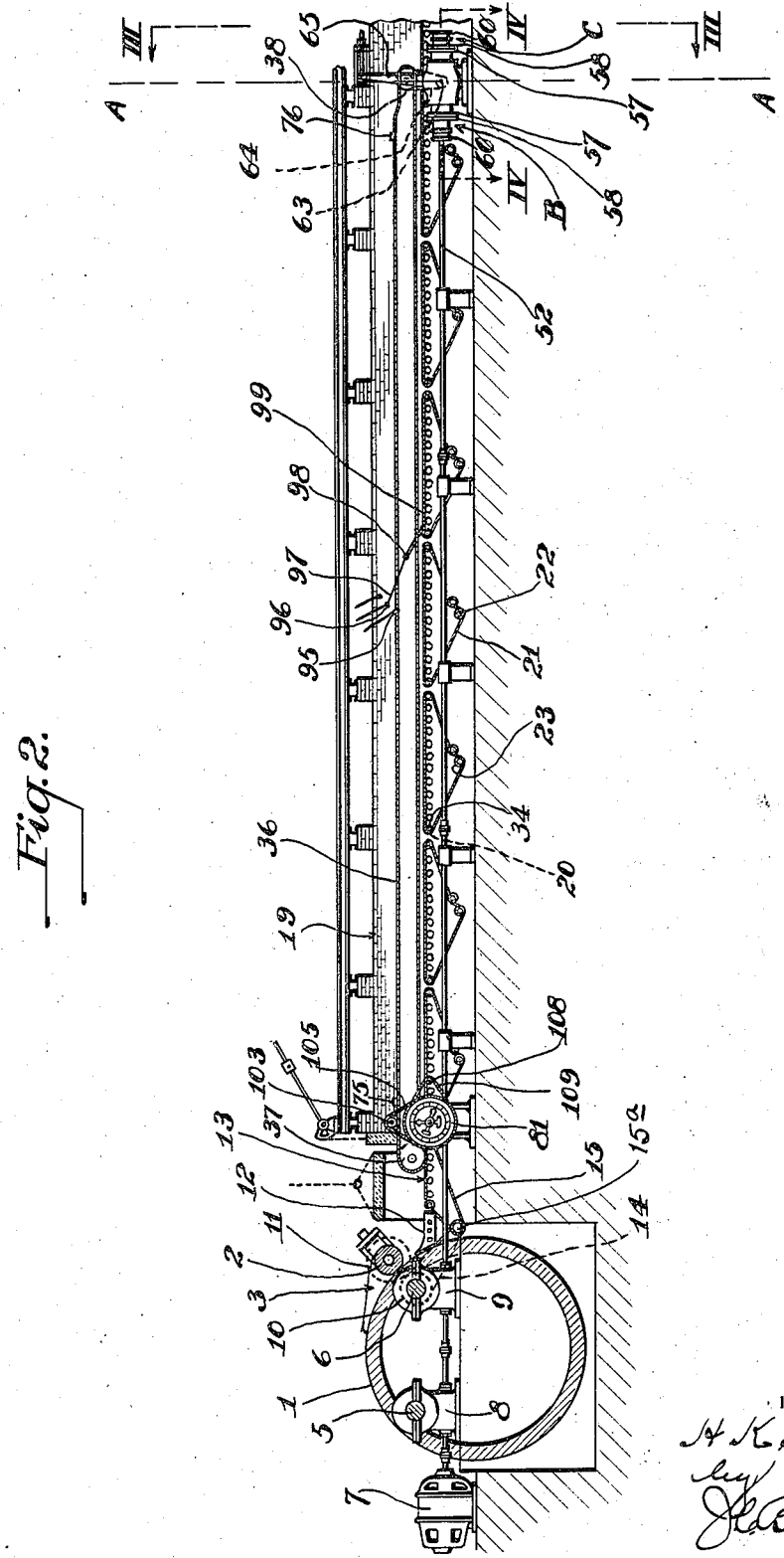
Figure 3:
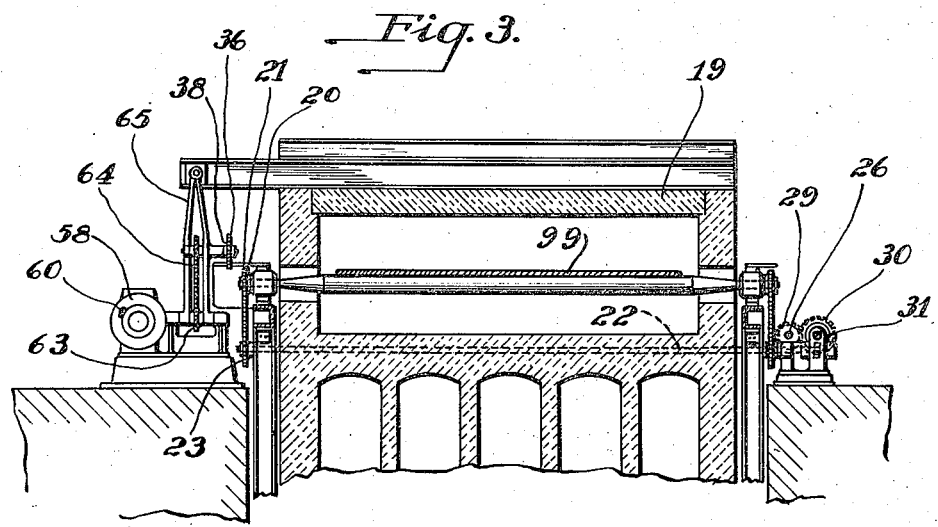
Figure 4:
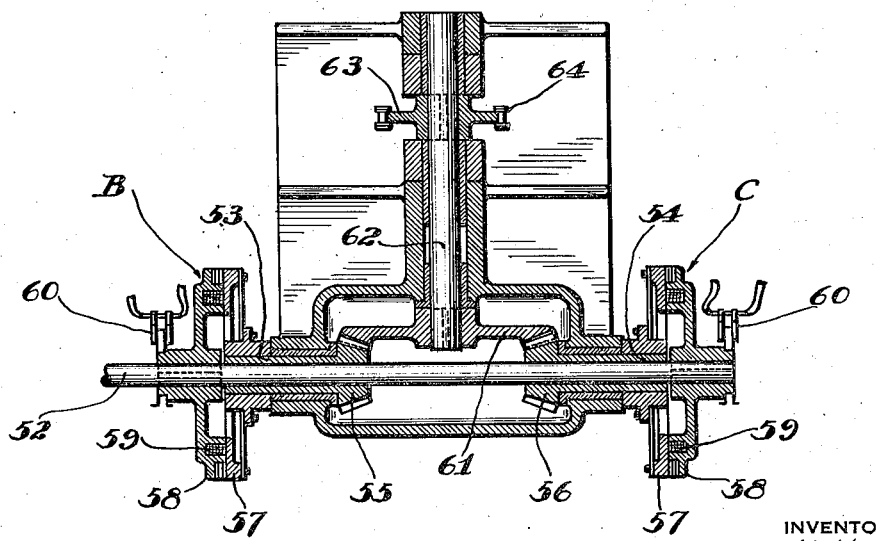
Figure 7:
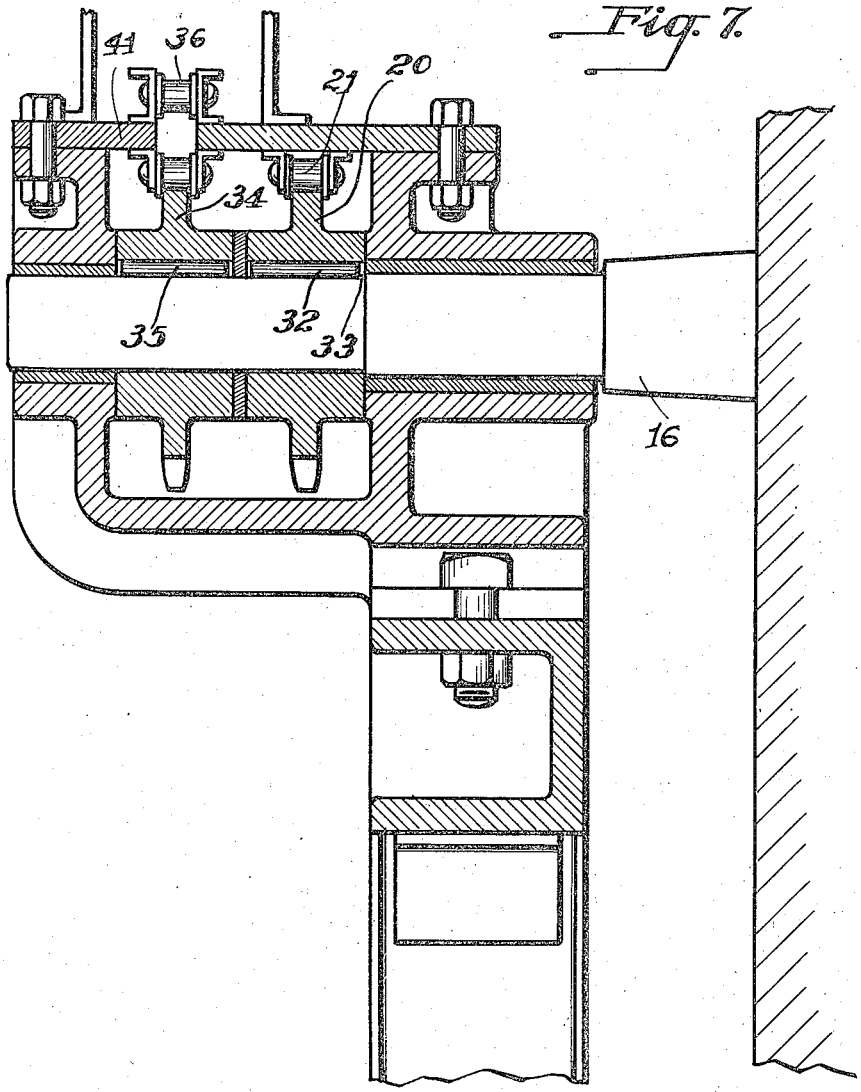

The invention relates to roller leer constructions for use in intermittent casting and rolling operations in the production of plate glass. The present construction is designed to carry out functions similar to those performed by the apparatus of the Heichert application, Serial Number 125,670, but by the employment of more direct means dispensing with a large part of the electrical connections, contacts and switches required in the construction set forth in said application. In a casting and rolling operation, it is desirable from the standpoint of production and quality that the glass be rolled into sheets at a high rate of speed, preferably in the neighborhood of 30 feet a minute, although this may be increased or decreased somewhat. Such a speed of production would necessarily call for a leer of very great length, if the glass sheets were carried entirely through the leer at the same high rate of speed at which it is produced. The leer of the present invention, like that of the Heichert application referred to, is designed so as to permit the glass to be carried through the front end of the leer at a high rate of speed, and then through the following (and major) portion of the leer at a speed which is only a fraction of the speed in the front end. One of the principal objects of the invention is the provision of improved means whereby the successive sheets of glass may be brought into relatively close proximity in their passage through the leer so that the full capacity of the leer may be utilized. A further object is to provide an improved means for making the shift from one speed to another in the entrance end of the leer automatic. A still further object is the provision of an improved arrangement of indicating means, governed by the glass sheets themselves, for informing the operator of the location of the ends of the sheets as they pass through the forward or high speed section of the leer. The arrangement is such, as more fully appears later, that the glass in passing from the high speed section of the leer to the low speed section is always supported by rolls which all have the same rate of peripheral speed so that there is no tendency to buckle the sheet, which might occur if the sheet were engaged at its forward end by the slow speed rolls, while it was still being supported at its rear end by the high speed rolls. The rolls are so arranged and timed that the forward end of the sheet which is being moved ahead by the high speed rolls comes closely adjacent the rear end of the preceding sheet which is being moved forward by the low speed rolls before the rate of movement of the high speed rolls is reduced, which arrangement, as above stated, allows the use of the leer to its full capacity. The rolls in the high speed section of the leer have a slow drive of the one way clutch type, and also a fast drive of the one way clutch type. This arrangement permits of the drive of the rolls at either of the two speeds, and when the high speed drive is discontinued, the slow speed drive immediately picks up the rolls through the one way clutches and drives them at a slow speed corresponding to the speed of the rolls further along in the main portion of the leer. Properly timed automatic switch devices control the shifting of the speed of the rolls in the high speed section from high speed to low speed, but, if desired, this control may be exercised by hand, the hand operation of the switches being facilitated by indicating devices heretofore referred to, which show the location in the leer of the front and rear ends of the sheets. The indicating devices preferably include switches which are operated by the ends of the glass sheets as they progress through the leer. The term leer is used throughout in its broad sense, the high speed portion of the runway leading to the slow speed section of the leer being regarded as a part of the leer, regardless of how much of, or to what extent, such high speed portion is left uncovered or unhooded in order to facilitate the cooling of the sheet when first formed and as it travels away from the rolling or generating apparatus. Certain embodiments of the invention are illustrated in the accompanying drawings, wherein:

Figure 1 is a plan view of one form of the apparatus. Fig. 2 is a longitudinal section, somewhat incomplete and diagrammatic in form. Fig. 3 is a section on the line III—III of Fig. 2. Fig. 4 is a horizontal section on an enlarged scale on the line IV—IV of Fig. 2. Fig. 5 is a front elevation on an enlarged scale of the indicating device. Fig. 6 is a section on the line VI—VI of Fig. 5. Fig. 7 is a section on the line VII—VII of Fig. 11. Fig. 8 is a diagrammatic side elevation of the high speed drive for the rolls.

Figure 13:
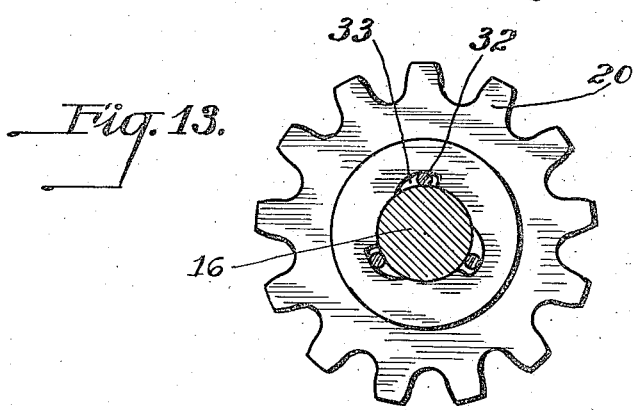

Fig. 9 is a diagrammatic view showing the electrical connections for automatically controlling the indicating device and the speed of the rolls in the high speed section of the leer. Figs. 10, 11 and 12 are enlarged detail views showing the drag chain for operating the rolls in the high speed section of the leer, Fig. 12 being a section on the line XII—XII of Fig. 11. Fig. 13 is a detail section showing one of the one way clutch devices. And Figs. 14, 15 and 16 illustrate diagrammatically a modification, Fig. 14 being a plan view, Fig. 15 a side elevation, and Fig. 16 an enlarged showing of the chain connection.

The rolling apparatus for generating the sheet is similar to that shown in the Showers Patent No. 1,579,666 and comprises a large annular shell 1 and a driven sizing roll 2 between which the molten pot of glass to be formed into a sheet is poured, the recess at 3 being large enough to receive the entire pot of glass and the ends of the recess being closed by triangular end members, not shown. The shell is supported upon the transverse rolls 5 and 6 journaled in a suitable framework, which is not shown. The rolls 5 and 6, which rotate the shell 1, are driven from the motor 7 through the intermediary of worm reducing gears located in the casings 8 and 9 and the sizing roll 2 is driven from the roll 6 by means of the spur gears 10 and 11 carried by the ends of the two rolls. In front of the roll 2 is a water cooled table 12 for receiving the glass sheet as it is first formed and in advance of this table is a set of apron rolls 13. These apron rolls are driven from the roll 6 by means of the chains 14 and 15 which pass around suitable sprockets on the rolls 6 and 13 and around other sprockets carried by the countershaft 15ª.

Forward of the apron rolls are the leer rolls 16, 17, 18, etc. located in the lower portion of the leer casing 19. These rolls carry at each end a sprocket wheel 20 and these sprocket wheels 20 (Fig. 7) are driven from the series of chains 21. The sprocket chains are in turn driven from the transverse countershafts 22 provided with suitable sprockets 23 engaging the chains. These countershafts are all driven from one of the motors 24, 24, duplicate motors being provided to give insurance against interruption in the operation of the leer in case of accident to one of the motors. A clutch 25 is provided for making either motor effective, such clutch being mounted upon the longitudinal drive shaft 26 and which is driven through the intermediary of the gears 27 and 28. The transverse shafts 22 are all driven through the countershaft 26 through the intermediary of suitable reduction gearing, including the spur gears 29 and 30 and worm gearing in the casings 31. In order to permit the rolls 16, 17, 18, etc. to be driven at a higher speed than that given by the motor 24 operating through the gearing just described, the sprockets 20 on such rolls are connected to the roll shafts by means of one way roller clutches (see Figs. 7 and 13), in which 32 are the rolls which engage suitable recesses 33 in the hubs of the sprocket wheels. This arrangement permits the rolls to be driven at a higher speed than the sprockets when the high speed drive is applied to such rolls, as later described. The high speed section of the leer terminates at the dotted line A—A of Figs. 1 and 2, but the drive shaft 26 extends along the entire length of the slow speed section of the leer lying to the right of the line A—A, so that under certain conditions all of the rolls of the leer are driven from the single motor 24 and from the line shaft 26.

Each of the rolls 16, 17 and 18 lying in the high speed section of the leer, is also provided with a sprocket 34 (Fig. 7) also secured to the shaft of the roll by means of a one way roller clutch including the rollers 35. These sprockets are arranged to be driven at high speed during the formation of a glass sheet while such sheet is being fed into the leer, at which time the peripheral speed of the rolls must necessarily correspond with that of the forming rolls 1 and 2. During this period, the roller clutches, including the rollers 35, become effective to drive the rolls forwardly during any desired interval of time, after which the operation of the sprockets 34 is discontinued and the slow speed drive as provided by the sprockets 20 becomes effective, thus moving the sheet forward at a relatively slow speed. The means preferably employed for giving the sprockets 34 their high speed movement during the generation of the sheet consists of the chain 36, shown in Figs. 2, 8, 9 and 11. This chain is a continuous one extending the length of the high speed section of the leer (Fig. 9) and passing around the sprockets 37 and 38, the sprocket 38 at the right hand end of the high speed section being the driven one by means of which the chain is moved first in one direction and then in the other. The lower flight of the chain 36 is so arranged that in the forward movement of such lower flight (to the right), Figs. 8 and 9, it successively engages the sprockets 34 just before the forward end of the glass sheet being generated arrives at the rolls carrying such sprockets. By the time the chain has picked up all of the sprockets throughout the length of the high speed section of the leer, the sheet will have been completely generated, so that the drive of the chain may be discontinued and the chain moved back again to starting position. When this reversal of the chain occurs, the movement of the rolls and the glass sheet carried thereby immediately slows down to a point where the sprockets 20 driven by the slow speed motor 24 pick up the drive of the rolls so that the sheet is fed ahead at the relatively slow speed corresponding to that of the main part of the leer.

The chain 36 is guided in the path of movement shown in Fig. 8 by guide plates 39, 40, 41, and 42, the method of supporting one of these plates being shown in Fig. 7. The two flights of the chain are connected by the two long links 43 and 44, so that the parts of each flight may be guided in two different planes, and the link 43 carries at its rear end a swinging link for facilitating the engagement of the chain with the successive sprockets 34, 34, 34, etc. as the lower flight of the chain moves to the right from the position of Fig. 8. This swinging link is shown in Figs. 10, 11 and 12. It comprises the side plates 45, 45, pivoted on the pintle 46 and a second pintle 47 connecting the other ends of the side plates and carrying the roller or sleeve 48. This link is free to swing up and down between the inclined plates, constituting the link 43. The side plates 45, 45 are provided with a bridge 49 engaging the stop pin 50, and this bridge is yieldingly pressed down by the leaf spring 51. This arrangement permits the link to move upward when it comes into contact with one of the teeth of a sprocket which may not be in meshing position, so that the roller on the link will ride over the tooth without catching and drop into the recess between such tooth and the next one.

The chain is adapted to be moved from the position of Fig. 8 so that the link 43 travels to the right over all the sprockets 34, thus successively speeding up all of the rolls 16, 17, 18, etc. until such link arrives adjacent the sprocket 38. When the link 43 arrives at this position, the glass sheet has been generated and lies upon the rolls of the high speed section, so that the drive of the rolls by the chain 36 may be discontinued, and the slow speed drive for the rolls as secured by the one way clutches is allowed to become effective. The movement of the chain 36 is therefore stopped and the direction of rotation of the driving sprocket is reversed to carry the chain back to starting position, preliminary to the generation of another sheet, the link 43 again occupying its starting position as shown in Fig. 8.

The motive power for driving the sprocket 38 and the chain 36 is supplied from the motor 7, which drives the sheet generating rolls 1 and 2. The line shaft 52 (Figs. 1 and 9) from this motor extends along the side of the leer, terminating at the driving and reversing mechanism, shown in Fig. 4. The end of the shaft section 52 carries the hubs 53 and 54 of the bevel gears 55 and 56, such hubs being free to rotate on the shaft. The hubs are adapted, however, to be secured to the shaft by the magnetic clutches B and C, so that the shaft may be used to rotate either one or the other of the gears 55 and 56. The clutches are made up of the ring members 57, 57 and 58, 58, the members 57, 57 being keyed to the hubs 53 and 54 and the members 58, 58 being keyed to the shaft 52. The members 58, 58 are provided with windings 59, 59 and a circuit is secured to and from the windings by the use of the brushes 60, 60 connected to the circuits later described in detail in connection with Fig. 9. The gears 55 and 56 mesh with a gear 61 keyed to the shaft 62 and this shaft drives the sprocket 38 through the intermediary of the sprocket 63 on the shaft 62 and the chain 64 passing around the two sprockets (Fig. 9). The sprocket 38 is carried by a swinging arm 65 (Fig. 9) pivoted on the shaft 62 and this arm is provided with a suitable take-up device 66ª for taking care of the slack in the chain 36. This arrangement provides for driving the chain 36 forward and backward from the continuously rotating drive shaft 52. When the winding of the clutch B is energized, the gear 55 drives the shaft 62 and the chain 36 forwardly, and when the winding of the clutch C is energized the parts are driven in the reverse direction from the gear 56. When neither clutch is energized, the shaft 52 runs idly without moving the chain 36.

The means for controlling the operation of the magnetic clutches and of the drive chain will be seen by reference to Fig. 9. In this arrangement, the motor 7 is controlled from the push button box 66 operating through the usual starter 67 and rheostat 68, current being supplied through the mains 69 and 70. The supply of current to the clutches B and C is controlled by the two way switch 71 shown in neutral position with its arm 72 lying between the contacts 73 and 74. Make and break switches are provided at 75 and 76 adapted to be operated by a cam 77 carried by the chain 36 and serving to make and break the circuits through the lines 78 and 79 leading respectively to the windings of the magnetic clutches B and C. When the motor 7 is started and the generation of a glass sheet from a mass of molten glass between the rolls 1 and 2 is started, the operator swings the handle 72 to the right, thus completing the circuit through the lines 80, 78 and 81, and energizing the magnetic clutch B so that the chain 38 is moved forwardly, the link 43 moving to the right (Fig. 8) from the position shown, and successively passing over the series of sprockets 34, so that these sprockets are each given the movement of the chain just before the forward edge of the glass sheet being generated arrives at the roll driven by the sprocket. This continues until the sheet is entirely in the leer, at which time the cam 77 carried by the chain engages the arm of the switch 75 opening such switch and breaking the circuit through the clutch B. The forward movement of the chain is thus stopped automatically and the speed of movement of the rolls and sheet drop back to that of the slow speed drive of the rolls which then becomes effective to carry the sheet out of the high speed section of the leer. At this time the operator swings the switch arm 72 to the left, making contact at 73 and completing the circuit through the lines 80, 79 and 81 and energizing the magnetic clutch C, so that the chain 38 is moved backwardly until the cam 77 engages the arm of the switch 76. This opens such switch, breaking the circuit through the clutch C, so that the chain 36 and link 43 are stopped at their starting position, as shown in Fig. 8, thus completing the cycle. When the sheet of glass is carried forward, so that its rear end approaches the end of the high speed section of the leer, another casting operation may be started, and a new sheet carried into the leer following the procedure as just set forth. The casting operations are so timed that the forward edge of the new sheet will approach quite close to the rear end of the preceding sheet before the shift from high speed to slow speed in the high speed section of the leer occurs. The blank spaces in the leer are thus reduced to a negligible length, and the leer is utilized to its full capacity.

In order to give the operator of the leer the necessary information, as to the location of the ends of the sheets in the leer, suitably operated indicating devices are employed, as hereinafter described. By the aid of this information, the operator can time the casting operation and the operation of the switch 72, so as to avoid any interference between the successive glass sheets, and so as to bring them closely adjacent each other in the leer, as heretofore referred to, thus utilizing the leer to its full capacity. The indicating device includes three pointers (one at the periphery of the dial and the other two arms at the center of the dial) calibrated to move over a dial graduated in feet to correspond to the lineal dimensions of the leer. One pointer (peripheral one) moves with the high speed drive chain, thus indicating how far into the leer the forward end of a sheet has moved at high speed. A second pointer (an arm) moves continuously with the slow speed drive of the leer rolls until the forward end of a sheet being formed reaches a predetermined point in the leer at which a switch is located. At this time, the pointer is released and moves back to the zero point on the dial, at which point it remains until the rear end of the sheet passes such predetermined point when the pointer starts forward again. The third pointer (also an arm) is controlled by the same switch which controls the second pointer, and is so arranged that this pointer does not move from the zero point of the dial until the front end of a sheet arrives at said predetermined point. This pointer thus indicates on the dial the position of the forward end of the sheet being formed, the switch being opened, and the pointer moving back to zero position when the rear end of the sheet passes said predetermined point. The operator is, in this way, informed as to the position of the ends of the two sheets in the high speed end of the leer.

The indicating arrangement just referred to will be understood by reference to Figs. 5, 6 and 9, the latter of which shows the switches operated by the glass sheets and the wiring connections. Referring to these figures, 81ª is a fixed dial graduated in feet, 82 is the peripheral pointer operated by the high speed chain 36, and 83 and 84 are the other two pointers (arms) adapted to be moved by the ratchet wheel 85, as later described, such arms being counterweighted (part 86) so that when released from the ratchet wheel, they will return by gravity to zero position. Each of the arms carries a small pawl 87 pivoted at 88, and normally spring held out of engagement with the ratchet wheel. The arms also carry the small solenoids 89 and 90 whose cores are connected to the pawls 87 so that when the solenoid windings are energized the pawls are pulled into engagement with the ratchet wheel. Current is supplied for operating the solenoids from the lines 91 and 92, the circuits also including the wires 93 and 94, terminating at the contacts 95 and 96. Working between the contacts is the end of the switch arm 97 pivoted at 98. When the lower end of the arm is lifted by the glass sheet 99, the upper end of the arm engages the contact 95 and the circuit through the winding of the solenoid 90 is completed, so that the pawl is caused to engage the ratchet wheel 85 and the arm 84 moves with such wheel. When the glass sheet moves from beneath the switch arm it moves down, breaking the contact with 95 and making contact with 96. In this latter position, the circuit through the winding of the solenoid 89 is completed and the pawl 87 is operated to engage the ratchet wheel so that the arm 83 moves with such wheel.

The pointer 82 is carried by a sprocket wheel 100, driven from the chain 36 through the intermediary of the sprocket 102 on the shaft 103, the sprocket wheel 104 and the chain 105 passing around the wheels 104 and 100. The pointer thus moves with the chain and its position always indicates the number of feet the forward end of the sheet being formed is inward from the end of the leer. The return movement of the chain brings the pointer back to zero position.

The ratchet wheel 85, has two toothed rims, as indicated in Fig. 6, one for each of the pawls 87 and is carried by the shaft 106, driven from the axle 107 of one of the leer rolls through the intermediary of the pinion 108, the chain 109 and the gear 110 keyed to the end of the shaft 106 (Fig. 6). The ratchet wheel thus always moves with the leer roll having the axle 107, and this movement may be fast or slow depending on whether the roll is being moved from the slow speed drive or from the high speed drive chain 36 as heretofore described.

When the high speed end of the leer is unoccupied by a glass sheet, the pointer 82 remains at the zero point, as shown, and the arm 83 moves around the dial continuously at high speed, since the switch arm 97 is swung down, so that its upper end engages the contact 96 and the circuit carrying the winding of the solenoid 89 is energized to pull the pawl into engagement with the ratchet wheel 85. This condition continues until a glass sheet is formed from the rolls 1 and 2 and its forward end reaches the first of the high speed rolls, at which time the operator swings the handle 72 of the two way switch to the right and starts the movement of the chain 36 forward, giving the leer rolls their high speed movement, as heretofore described. The pointer 82 now moves with the sheet, so that as long as the drive by the chain 36 continues, the pointer moves forward, thus indicating the distance into the leer which the sheet has progressed.

When the forward end of the sheet reaches the switch arm 97, it lifts such arm causing its upper end to move away from the contact 96 and engage the contact 95. The circuit through the winding of the solenoid 89 is broken and that through the winding of the solenoid 90 is completed. When the circuit through 89 is broken, the pawl is released from the ratchet wheel 85 and the arm moves by gravity to zero position. At the same time, the arm 84, which up to that time had been standing at zero position, starts to move forward since its pawl is caused, at such time, to engage the ratchet wheel as a result of the energizing of the winding of the solenoid 90. From this time on, therefore, the position of the forward end of the glass sheet forward of the switch arm 97 is indicated by the arm 84. The arm 83 remains stationary and the arm 84 continues to move forward until the rear end of the sheet passes from beneath the switch arm 97, when the arm moves by gravity (or by spring action) back to its previous position with its upper end in engagement with the contact 96. This causes the release of the pawl on the arm 84 and such arm moves back to zero position, while the pawl on the arm 83 engages the ratchet wheel and starts to move forward. The movements of the arms 83 and 84, as above described, thus keep the operator informed as to the positions of the front and rear ends of the glass sheets in the leer so that he can time the successive rolling operations and the operation of the switch arm 72 accordingly.

Figs. 14, 15 and 16 illustrate a modification in which a different arrangement is provided for driving and reversing the movement of the drag chain 111 corresponding in function to the drive chain 36 of the Figs. 1 to 13 construction. In this arrangement, a separate motor 112 is provided for driving the high speed chain, and the backward movement of the chain is secured by reversing this motor. The reversing and stopping of the motor is accomplished by cams carried by the drag chain arranged to engage switches which are suitably positioned in the line of movement of the cams. The motor which drives the forming rolls and the motor operating the drag chain are synchronized by having such forming roll motor in driving engagement with the apron rolls of the leer, which are also engaged by the drag chain.

Referring to the drawings, the motor 7 drives the forming rolls 1 and 2 in the same manner as in the Fig. 1 construction. Similarly, the motor 24 drives the leer rolls at slow speed through the shafting 26 in the same manner as in the Fig. 1 construction. The drag chain 111 for giving the rolls in the first part of their leer their high speed of movement passes around the sprockets 113 and 114 at its ends, and this drag chain and its method of successively engaging the sprockets on the ends of the leer rolls is the same as heretofore described in connection with Figs. 8, 10 and 11. The sprocket 114 is driven from the motor 112 through the intermediary of the reduction gearing in the casing 115 and a chain 116 which passes around suitable sprockets on the drive shaft leading from the casing 115 and on the shaft which carries the sprocket 114, as will be seen by reference to Figs. 14 and 15. The drag chain 111 passes over a portion of the apron rolls 117, and such apron rolls also have driving connections with a countershaft 118 in the form of the chain 119 passing around the sprockets on the rolls and around the sprocket 120 keyed to the countershaft. The countershaft is in turn connected to a sprocket on the shaft of the roller 6 by means of the sprocket 120ª driven from the chain 120ᵇ. Since the roller 6 is driven from the motor 7, it will be seen that connections as just described serve to synchronize the movements of the motors 7 and 112, so that the peripheral speed of the leer rolls when driven by the drag chain is always the same as the peripheral speed of the sheet forming rolls 1 and 2. This insures that there shall be no buckling or stretching of the sheet due to the leer rolls running faster or slower than the rate at which the glass sheet is generated.

The positions of the ends of the sheets in the leer are indicated by means of the electric lamp 121 (Fig. 15), in the circuit 122, 123, which also includes the switch arm 124 pivoted at 125 and adapted to be swung by the glass sheet so as to engage the contact 126. When the forward end of a glass sheet engages the lower end of the arm, it is swung around the pivot so that its upper end engages the contact 126, thus lighting the lamp. The light shows until the sheet passes the arm, when it moves down to the position shown, breaking the contact at 126, so that the light from the lamp is discontinued.

The drag chain 111 is provided with two cams 127 and 128 adapted to operate the switch arms 129 and 130. The switches are connected to the electric circuit, including the motor 112, so that when the cam 127, moving to the left, (Fig. 15) reaches the arm 129 the motor is reversed, and the chain then runs backward carrying the cam 128 to the right to the position shown, at which time such cam engages the arm 130 stopping the motor.

In operation, after the molten glass is supplied to the rolls 1 and 2 and the end of the sheet generated approaches the apron rolls, the operator presses a push button which starts the motor 112, thus giving the lower flight of the drag chain 111 a movement to the right (Fig. 15) to successively bring the leer rolls to high speed as heretofore described. After the sheet is completely formed and in the leer, the cam 127 which has been moving to the left engages the arm 129, thus reversing the motor and causing the chain to move back to starting position, the slow speed drive at such time picking up the drive of the rolls. When the chain arrives again at starting position, the cam 128 engages the switch arm 130 and causes the motor 112 to stop, thus completing the cycle.

What I claim is:

1. In combination with apparatus for intermittently rolling sheets of glass, of a roller leer comprising a high speed section which receives the sheets from the rolling apparatus and a slow speed section following the high speed section, means for driving the rolls of both sections at a relatively low peripheral speed, such means including one way clutch means for driving the rolls of the high speed section, and other means for driving the rolls of the high speed section at a relatively high speed, such means including another set of one way clutch means.

2. In combination with apparatus for intermittently rolling sheets of glass, of a roller leer comprising a high speed section which receives the sheets from the rolling apparatus and a slow speed section following the high speed section, means for driving the rolls of both sections at a relatively low peripheral speed, such means including one way clutch means for driving the rolls of the high speed section, a series of other one way clutches for driving the rolls of the high speed section, and driving means for successively actuating said last clutches to drive the rolls of the high speed section at a relatively high speed corresponding to that at which the glass sheet is generated as the forward edge of such sheet advances along said high speed section.

3. In combination with apparatus for intermittently rolling sheets of glass, of a roller leer comprising a high speed section which receives the sheets from the rolling apparatus and a slow speed section following the high speed section, means for driving the rolls of both sections at a relatively low peripheral speed, such means including one way clutch means for driving the rolls of the high speed section, a series of other one way clutches for driving the rolls of the high speed section, driving means for successively actuating said last clutches to drive the rolls of the high speed section at a relatively high speed corresponding to that at which the glass sheet is generated as the forward edge of such sheet advances along said high speed section, and means for disconnecting said last driving means after the sheet is completely generated.

4. In combination with apparatus for intermittently rolling sheets of glass, of a roller leer comprising a high speed section which receives the sheets from the rolling apparatus and a slow speed section following the high speed section, means for driving the rolls of both sections at a relatively low peripheral speed, such means including one way clutch means for driving the rolls of the high speed section, a series of other one way clutches for driving the rolls of the high speed section, driving means for successively actuating said last clutches to drive the rolls of the high speed section at a relatively high speed corresponding to that at which the glass sheet is generated as the forward edge of such sheet advances along said high speed section, and means for automatically disconnecting said last driving means after the sheet is completely generated.

5. In combination with apparatus for intermittently rolling sheets of glass, of a roller leer comprising a high speed section which receives the sheets from the rolling apparatus and a slow speed section following the high speed section, means for driving the rolls of both sections at a relatively low peripheral speed, such means including one way clutch means for driving the rolls of the high speed section, a series of other one way clutches for driving the rolls of the high speed section, a reciprocating driving means for causing said last clutches to pick up and drive the rolls of the high speed section at a relatively high speed corresponding to that at which the glass sheet is generated as the forward edge of such sheet advances along said high speed section, means for stopping the forward movement of said driving means, and means for returning said means to starting position.

6. In combination with apparatus for intermittently rolling sheets of glass, of a roller leer comprising a high speed section which receives the sheets from the rolling apparatus and a slow speed section following the high speed section, means for driving the rolls of both sections at a relatively low peripheral speed, such means including one way clutch means for driving the rolls of the high speed section, a series of other one way clutches for driving the rolls of the high speed section, a reciprocating driving means for causing said last clutches to pick up and drive the rolls of the high speed section at a relatively high speed corresponding to that at which the glass sheet is generated as the forward edge of such sheet advances along said high speed section, automatic means for stopping the forward movement of said driving means after the sheet is completely generated, and means for returning said means to starting position.

7. In combination with apparatus for intermittently rolling sheets of glass, of a roller leer comprising a high speed section which receives the sheets from the rolling apparatus and a slow speed section following the high speed section, means for driving the rolls of both sections at a relatively low peripheral speed, such means including one way clutch means for driving the rolls of the high speed section, a series of other one way clutches for driving the rolls of the high speed section, a sprocket for driving each of said other one way clutches, and a chain mounted for movement over said sprockets, and arranged and driven so that it successively engages said sprockets and causes the rolls driven thereby to move with a peripheral speed corresponding to that of the glass sheet which is being generated.

8. In combination with apparatus for intermittently rolling sheets of glass, of a roller leer comprising a high speed section which receives the sheets from the rolling apparatus and a slow speed section following the high speed section, means for driving the rolls of both sections at a relatively low peripheral speed, such means including one way clutch means for driving the rolls of the high speed section, a series of other one way clutches for driving the rolls of the high speed section, a sprocket for driving each of said other one way clutches, a chain mounted for reciprocation over said sprockets, and arranged and driven so that it successively engages said sprockets and causes the rolls driven thereby to move with a peripheral speed corresponding to that of the glass sheet which is being generated, and means for stopping the forward movement of the chain after the glass sheet is generated and for returning it to starting position after the sheet is generated.

9. In combination with apparatus for intermittently rolling sheets of glass, of a roller leer comprising a high speed section which receives the sheets from the rolling apparatus and a slow speed section following the high speed section, means for driving the rolls of both sections at a relatively low peripheral speed, such means including one way clutch means for driving the rolls of the high speed section, a series of other one way clutches for driving the rolls of the high speed section, a sprocket for driving each of said other one way clutches, a chain mounted for reciprocation over said sprockets, and arranged and driven so that it successively engages said sprockets and causes the rolls driven thereby to move with a peripheral speed corresponding to that of the glass sheet which is being generated, automatic means for stopping the forward movement of the chain after the glass sheet is generated and means for returning it to starting position after the sheet is generated.

In testimony whereof, I have hereunto subscribed my name this 1st day of November, 1926.

HALBERT K. HITCHCOCK.